United States Patent
Caliskan et al.

(10) Patent No.: US 10,137,761 B2
(45) Date of Patent: Nov. 27, 2018

(54) INTEGRATED ROOF BOW AND HVAC DUCT WITH A HEADLINER PROVIDING A CLOSE-OUT WALL OF THE DUCT

(71) Applicant: FORD GLOBAL TECHNOLOGIES, LLC, Dearborn, MI (US)

(72) Inventors: Ari Garo Caliskan, Canton, MI (US); David Anthony Wagner, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/466,567

(22) Filed: Mar. 22, 2017

(65) Prior Publication Data

US 2018/0272841 A1    Sep. 27, 2018

(51) Int. Cl.
| | |
|---|---|
| B62D 25/06 | (2006.01) |
| B60H 1/24 | (2006.01) |
| B60R 13/02 | (2006.01) |
| B60H 1/00 | (2006.01) |
| B62D 29/04 | (2006.01) |

(52) U.S. Cl.
CPC ......... *B60H 1/245* (2013.01); *B60H 1/00564* (2013.01); *B60R 13/0218* (2013.01); *B62D 25/06* (2013.01); *B62D 29/043* (2013.01)

(58) Field of Classification Search
CPC . B62D 25/06; B60R 13/0212; B60R 13/0218; B60R 13/02; B60H 1/00564; B60H 1/245; B60H 1/24; B60H 1/241
See application file for complete search history.

(56) References Cited

U.S. PATENT DOCUMENTS

| | | | | |
|---|---|---|---|---|
| 4,432,213 A * | 2/1984 | Katahira | ............ | B60H 1/00207 296/208 |
| 4,640,184 A * | 2/1987 | Matsushima | ...... | B60H 1/00557 454/137 |
| 6,062,635 A * | 5/2000 | Learman | ............ | B60H 1/00564 296/208 |
| 6,086,145 A * | 7/2000 | Wandyez | ............... | B60K 37/00 296/214 |
| 6,120,091 A * | 9/2000 | Reich | ....................... | B60R 11/00 296/214 |
| 6,543,841 B1 * | 4/2003 | Ohkubo | ................. | B62D 25/06 296/102 |
| 6,685,262 B1 * | 2/2004 | Tiesler | ............... | B60H 1/00564 296/208 |
| 6,887,552 B2 * | 5/2005 | Dykman | ............. | B60R 13/0218 264/250 |
| 6,899,381 B1 * | 5/2005 | Fero | ..................... | B60R 13/0225 296/208 |
| 7,237,834 B2 * | 7/2007 | Czinki | ............... | B60R 13/0225 296/208 |
| 7,334,834 B2 | 2/2008 | Hill et al. | | |

(Continued)

*Primary Examiner* — Gregory A Blankenship
(74) *Attorney, Agent, or Firm* — Jason Rogers; Brooks Kushman P.C.

(57) ABSTRACT

A vehicle having a body including a roof supported between spaced roof rails. A plurality of roof bows extend between and are attached to the roof rails that reinforce the roof. The roof bows define an air distribution duct that includes an air inlet and at least one air vent. The air distribution duct defines a downwardly facing open channel that is closed by a headliner.

17 Claims, 3 Drawing Sheets

(56) References Cited

U.S. PATENT DOCUMENTS

| | | | |
|---|---|---|---|
| 8,128,161 B2* | 3/2012 | Yang | B60H 1/00564 296/208 |
| 8,641,134 B2 | 2/2014 | Sawyer et al. | |
| 2002/0195844 A1* | 12/2002 | Hipwell | B60R 13/02 296/214 |
| 2003/0096129 A1* | 5/2003 | Kojima | B32B 27/20 428/512 |
| 2007/0044492 A1* | 3/2007 | Ichikawa | B60H 1/00378 62/239 |
| 2007/0123157 A1 | 5/2007 | Shah et al. | |
| 2011/0121614 A1* | 5/2011 | Kobayashi | B62D 21/157 296/210 |
| 2011/0127803 A1* | 6/2011 | Ludwig | B60H 1/00564 296/208 |
| 2014/0335295 A1* | 11/2014 | Onodera | C08L 23/04 428/36.5 |

* cited by examiner

INTEGRATED ROOF BOW AND HVAC DUCT WITH A HEADLINER PROVIDING A CLOSE-OUT WALL OF THE DUCT

TECHNICAL FIELD

The disclosure relates to roof bows for a vehicle that also function as an air duct.

BACKGROUND

Vehicle roof structures are generally constructed with roof rails on opposite lateral sides of the vehicle being supported by pillars above the doors and windows of the passenger compartment. The roof rails are connected below the outer surface of the roof by a plurality of bows that extend laterally above the passenger compartment.

Heating Ventilating and Air Conditioning (HVAC) ducts and vents are provided inside vehicle structures such as the dashboard, doors, floors and roof. Routing HVAC ducts between the roof bows and headliner of a vehicle may be an efficient way to provide heating, ventilation and air conditioned air to rear seat passengers. However, assembling HVAC ducts below roof bows results in a reduction of available headroom in the vehicle.

Roof bows are normally formed as sheet metal stampings that function solely to reinforce the roof of a vehicle. HVAC ducts are normally formed as plastic tubes and function solely to direct air to areas within the vehicle that require ventilation. Both roof bows and HVAC ducts add weight to a vehicle and consequently reduce fuel efficiency because of the weight of the parts. In addition, roof bows and HVAC ducts are separately assembled to a vehicle adding to the complexity of vehicle assembly processes.

This disclosure is directed to solving the above problems and other problems as summarized below.

SUMMARY

According to one aspect of this disclosure, a roof bow/air duct apparatus is disclosed for a roof of a vehicle having right and left roof rails. The roof bow/duct apparatus includes a plurality of transversely extending duct/bow portions assembled between the roof rails that define an air inlet. A longitudinally extending duct portion and the duct/bow portions define an air flow distributor. A headliner closes off a lower side of the distributor and includes an air distribution vent.

According to another aspect of this disclosure, the roof bow/air duct apparatus may further comprise an air inlet supplying pressurized conditioned air to at least one of the transversely extending duct/bow portions. The plurality of transversely extending duct/bow portions may include a front duct/bow portion, an intermediate duct/bow portion and a rear duct/bow portion. The roof bow/air duct apparatus may also include an air inlet supplying pressurized conditioned air to the front duct/bow portion. The air distribution vent may be disposed in the rear duct/bow portion. Additional air distribution vents may be provided in the front duct/bow portion and the intermediate duct/bow portion.

The air flow distributor may be an integral one-piece molded fiber reinforced member. The transversely extending duct/bow portions are attached to the right and left roof rails to provide a structural reinforcement connecting the roof rails.

A cross-section of a portion of the air flow distributor taken transverse to a direction of air flow through the air flow distributor may be a hat-shaped section including an upper/central portion, two sidewalls extending downward from opposite side of the upper/central portion and two headliner attachment flanges extending outwardly from a lower edge of each of the sidewalls. The headliner may be attached to the headliner attachment flanges with an adhesive and the upper/central portion may be attached to the roof with an adhesive. Alternatively, the headliner may be attached to the headliner attachment flanges with permanent magnets and the upper/central portion may be attached to the roof with an adhesive.

According to another aspect of this disclosure a vehicle is disclosed that comprises a body including a roof supported between spaced roof rails. A plurality of roof bows extend between and are attached to the roof rails that reinforce the roof and define an air distribution duct that includes an air inlet and at least one air vent.

According to other aspects of this disclosure, as it relates to a vehicle, the air distribution duct defines a downwardly facing open channel that is closed by a headliner. The roof bows include a front duct/bow portion, an intermediate duct/bow portion and a rear duct/bow portion. The roof bow may be an integral one-piece molded fiber reinforced member.

A cross-section of a portion of the roof bows taken transverse to a direction of air flow through the air distribution duct is a hat-shaped section including an upper/central portion, two sidewalls extending downward from opposite sides of the upper/central portion and two headliner attachment flanges extending outwardly from a lower edge of each of the sidewalls. The headliner may be attached to the headliner attachment flanges with an adhesive and the upper/central portion may be attached to the roof with an adhesive. In an alternative embodiment, the headliner is attached to the headliner attachment flanges with permanent magnets and the upper/central portion is attached to the roof with an adhesive.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of components. The specific structural and functional details disclosed are not to be interpreted as limiting, but as a representative basis for teaching one skilled in the art how to practice the disclosed concepts.

Figure 1:
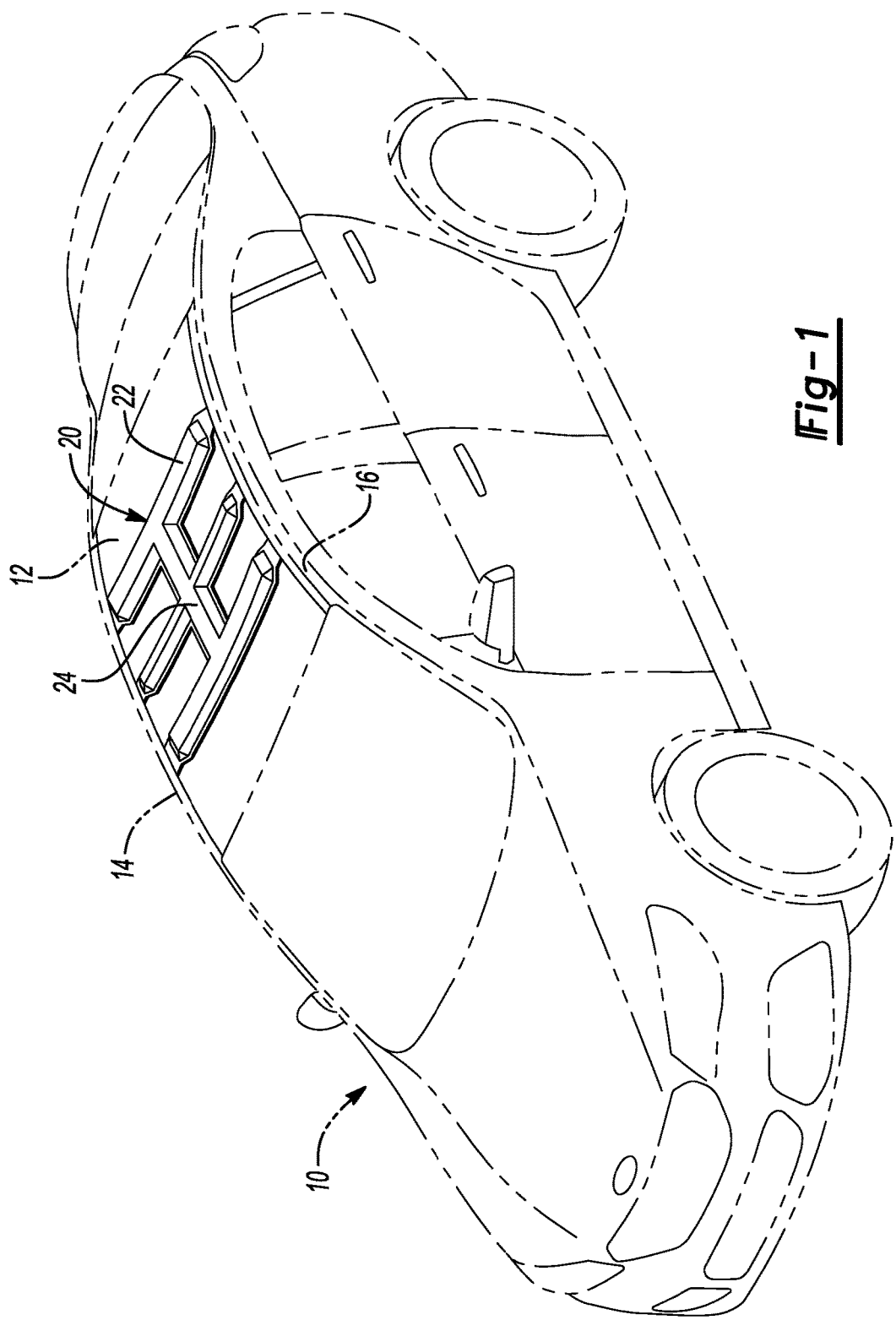
FIG. 1 a left/front perspective view of a vehicle in phantom lies that includes a set of integrated roof bows and HVAC duct made according to one aspect of this disclosure.

Referring to FIG. 1, a vehicle body 10 is illustrated in phantom lines to include a roof 12 that is supported on right roof rail 14 and left roof rail 16. A roof bow/air duct apparatus is generally indicated by reference numeral 20. The roof bow/air duct apparatus 20 includes bow/duct portions 22 and a longitudinal duct portion 24.

Figure 2:
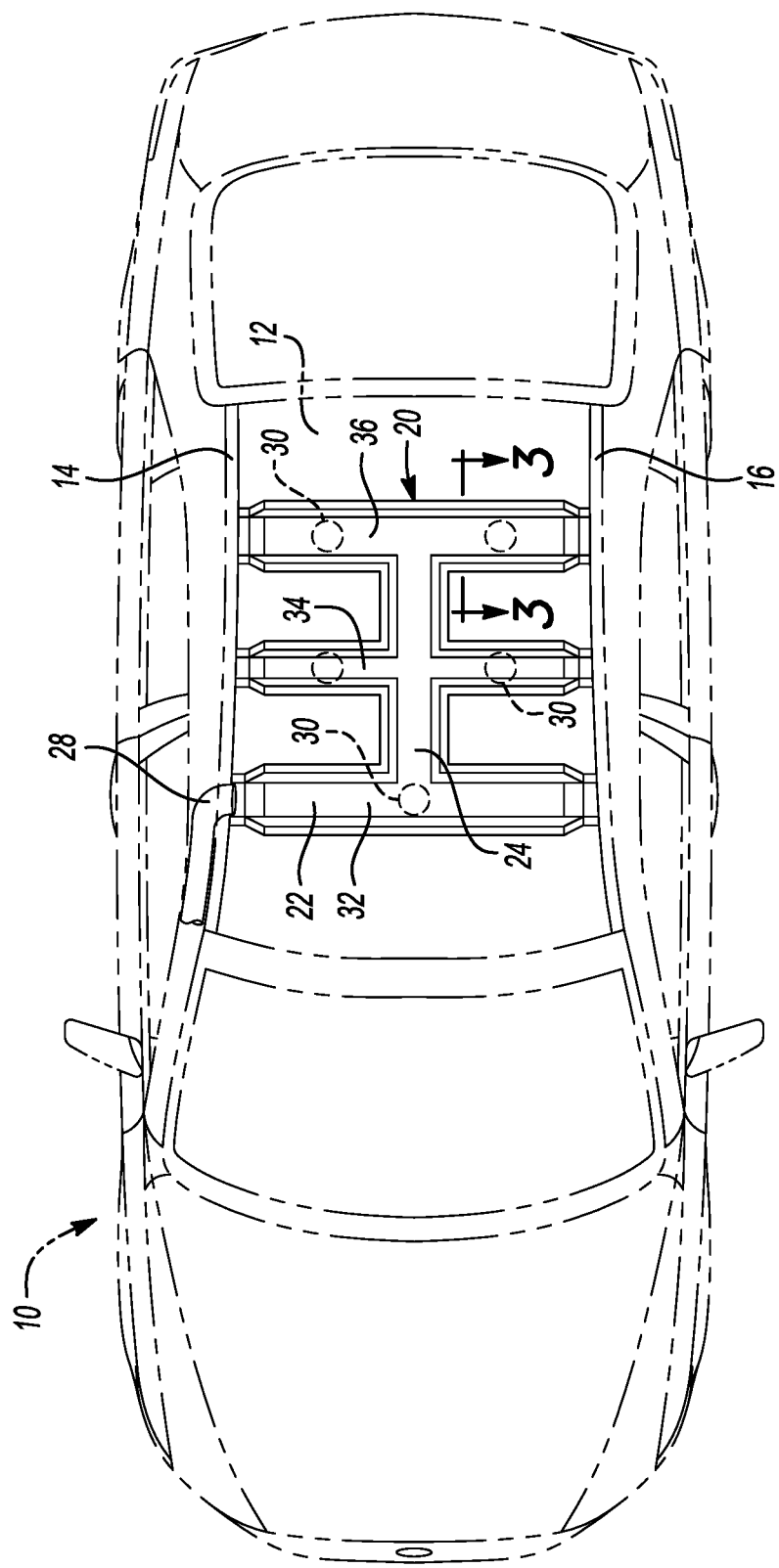
FIG. 2 is a top plan view of a vehicle in phantom lies that includes a set of integrated roof bows and HVAC duct as shown in FIG. 1.

Referring to FIG. 2, the vehicle body 10 is again shown to include the roof 12, right and left roof rails 14 and 16 and the roof bow/air duct apparatus 20. An air inlet 28 is partially shown that is used to distribute air from the heating and HVAC system of the vehicle to the roof bow/air duct apparatus 20. The air inlet 28 provides air to one of the bows/duct portions 22 and is located near one of the roof rails. A plurality of air distribution vents 30 are provided in the roof bow/air duct apparatus 20. The air distribution vents 30 may be in the bow/duct portions 22 or in the longitudinal duct portion 24 depending upon the HVAC requirements for a given vehicle. The air distribution vents 30 may be in the front duct/bow 32, intermediate duct/bow 34 or in a rear duct/bow 36.

Figure 3:
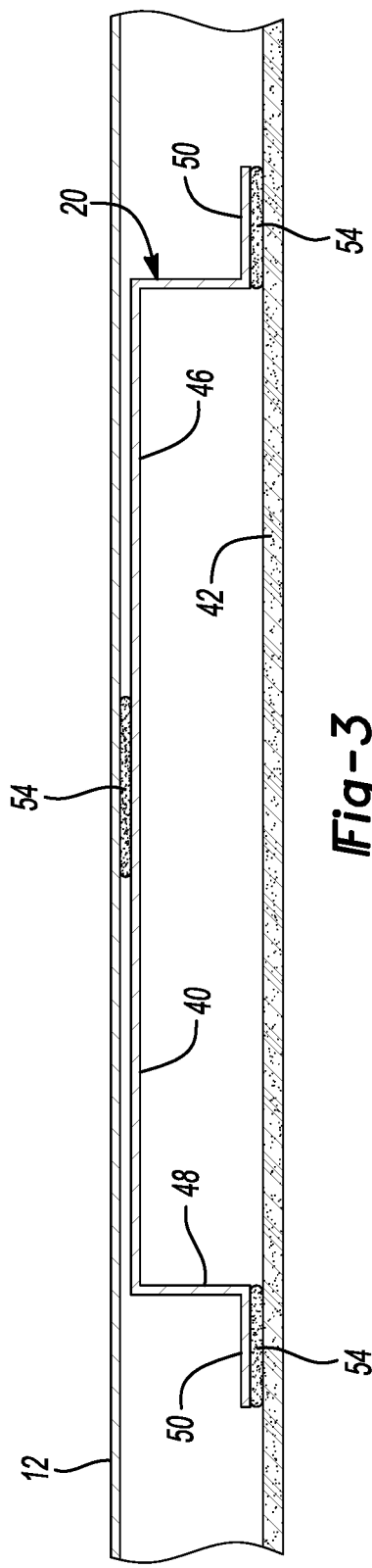
FIG. 3 is a cross-sectional view taken along the line 3-3 in FIG. 2.
Figure 4:
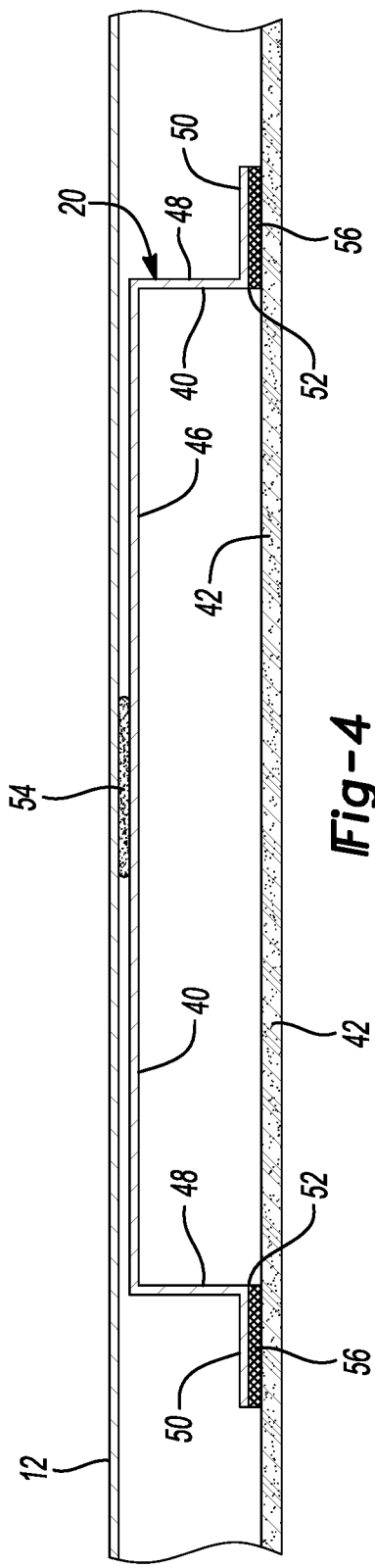
FIG. 4 is a cross-sectional view, similar to the cross-sectional view of FIG. 3, showing an alternative headliner attachment mechanism.

Referring to FIGS. 3 and 4, a lower side 40 of the roof bow/air duct apparatus 20 is shown being closed by a headliner 44. The lower side 40 of the roof bow/air duct apparatus 20 defines a low-profile channel that is closed off by the headliner 42 to form the ducts.

The cross-section of the roof bow/air duct apparatus 20 includes an upper central portion 46 that is flanked on opposite sides by a pair of sidewalls 48. The sidewalls 48 extend downwardly from opposite sides of the upper/central portion 46 and define the open channel that is made up of the upper/central portion 46 and the sidewalls 48. A pair of headliner attachment flanges 50 extend outwardly from the sidewalls 48. The headliner attachment flanges 50 extend from a lower edge 52 of the sidewalls 48.

Referring to FIG. 3, the roof 12 is shown with the roof bow/air duct apparatus 20 attached to the lower surface of the roof 12. The lower side 40 is closed by the headliner 42. The upper/central portion 46 is secured with an adhesive 54 to the roof 12. The attachment flanges 50 are attached by adhesive 54 to the headliner 42. The duct through which the HVAC air is a channel defined by the upper/central portion 46, sidewalls 48 and headliner 42.

Referring to FIG. 4, an alternative approach to attaching the headliner 42 to the roof bow/air duct apparatus 20 is illustrated wherein magnets 56 are used to secure the headliner 42 to the headliner attachment flanges 50.

The roof bow/air duct apparatus 20 is preferably formed of a fiber reinforced composite including a resin matrix and reinforcement fibers. The composite material may be a polymeric resin reinforced with glass fibers, carbon fibers, or the like. The fibers may be provided as loose fibers or as a mat of fibers. To function as a roof bow, the bow/duct portions 22 (shown in FIGS. 1 and 2) must have considerable tensile and compressive strength to reinforce the roof 12. The integrated roof bow/air duct apparatus 20 is made of a structural material having appropriate physical properties to function as a roof bow and allow elimination of conventional metal roof bows. The bow/duct portions 22 are attached at opposite ends to the right and left roof rails 14 and 16 to provide crush resistance in side impact collisions.

The upper/central portion 46 of the roof bow/duct apparatus, if formed of a composite material, provides in insulation and inhibits heat transfer between the roof 12 and the roof bow/air duct apparatus 20 ducting area below the upper/central portion 46.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A roof bow/air duct apparatus for a roof of a vehicle having right and left roof rails comprising:
    a plurality of transversely extending duct/bow portions assembled between the roof rails and defining an air inlet;
    a longitudinally extending duct portion;
    the duct/bow portions and the duct portion defining an air flow distributor; and
    a headliner closing off a lower side of the distributor and including an air distribution vent.

2. The roof bow/air duct apparatus of claim 1 further comprising:
    an air inlet supplying pressurized conditioned air to at least one of the transversely extending duct/bow portions.

3. The roof bow/air duct apparatus of claim 1 wherein the plurality of transversely extending duct/bow portions include a front duct/bow portion, an intermediate duct/bow portion and a rear duct/bow portion.

4. The roof bow/air duct apparatus of claim 3 further comprising:
    an air inlet supplying pressurized conditioned air to the front duct/bow portion.

5. The roof bow/air duct apparatus of claim 3 wherein the air distribution vent is disposed in the rear duct/bow portion.

6. The roof bow/air duct apparatus of claim 5 wherein additional air distribution vents are provided in the front duct/bow portion and the intermediate duct/bow portion.

7. The roof bow/air duct apparatus of claim 1 wherein the air flow distributor is an integral one-piece molded fiber reinforced member.

8. The roof bow/air duct apparatus of claim 7 wherein the transversely extending duct/bow portions are attached to the right and left roof rails to provide a structural reinforcement connecting the roof rails.

9. The roof bow/air duct apparatus of claim 1 wherein a cross-section of a portion of the air flow distributor taken transverse to a direction of air flow through the air flow distributor is a hat-shaped section including an upper/central portion, two sidewalls extending downward from opposite side of the upper/central portion and two headliner attachment flanges extending outwardly from a lower edge of each of the sidewalls.

10. The roof bow/air duct apparatus of claim 9 wherein the headliner is attached to the headliner attachment flanges with an adhesive and the upper/central portion is attached to the roof with an adhesive.

11. The roof bow/air duct apparatus of claim 9 wherein the headliner is attached to the headliner attachment flanges with permanent magnets and the upper/central portion is attached to the roof with an adhesive.

12. A vehicle comprising:
    a chassis;
    a drivetrain;
    a body including a roof supported between spaced roof rails; and
    a plurality of roof bows extending between and attached to the roof rails for reinforcing the roof and defining an air distribution duct, wherein the air distribution duct includes an air inlet and at least one air vent, wherein the air distribution duct defines a downwardly facing open channel that is closed by a headliner.

13. The vehicle of claim 12 wherein the roof bows include a front duct/bow portion, an intermediate duct/bow portion and a rear duct/bow portion.

14. The vehicle of claim 12 wherein the roof bow is an integral one-piece molded fiber reinforced member.

15. A vehicle comprising:
   a chassis;
   a drivetrain;
   a body including a roof supported between spaced roof rails; and
   a plurality of roof bows extending between and attached to the roof rails for reinforcing the roof and defining an air distribution duct, wherein the air distribution duct includes an air inlet and at least one air vent, wherein a cross-section of a portion of the roof bows taken transverse to a direction of air flow through the air distribution duct is a hat-shaped section including an upper/central portion, two sidewalls extending downward from opposite side of the upper/central portion and two headliner attachment flanges extending outwardly from a lower edge of each of the sidewalls.

16. The vehicle of claim 15 wherein the headliner is attached to the headliner attachment flanges with an adhesive and the upper/central portion is attached to the roof with an adhesive.

17. The vehicle of claim 15 wherein the headliner is attached to the headliner attachment flanges with permanent magnets and the upper/central portion is attached to the roof with an adhesive.

* * * * *